S. G. BARNSTEAD.
RECEPTACLE.
APPLICATION FILED AUG. 29, 1914. RENEWED APR. 21, 1920.
1,348,134. Patented July 27, 1920.
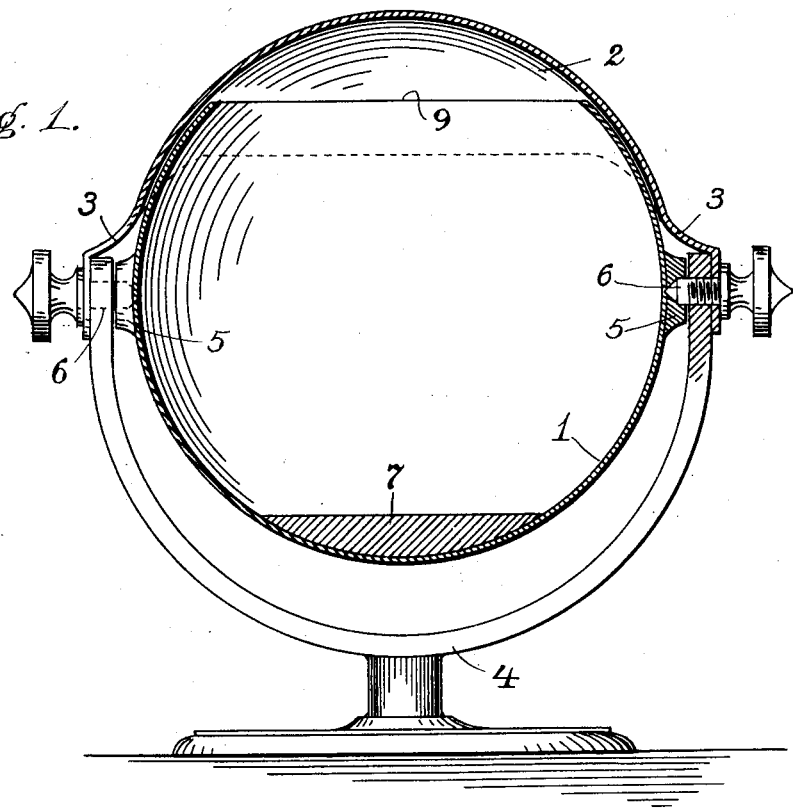
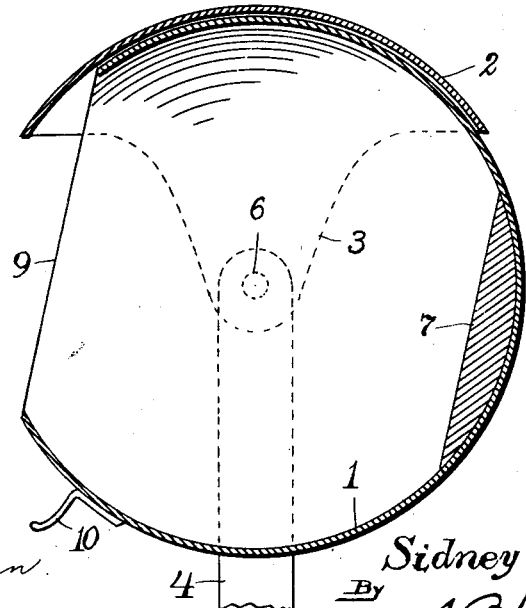
Witnesses;
A. Silverman
Beatrice M. Morash
Inventor,
Sidney G. Barnstead;
By A. B. Upham,
Attorney.

UNITED STATES PATENT OFFICE.

SIDNEY G. BARNSTEAD, OF BOSTON, MASSACHUSETTS.

RECEPTACLE.

1,348,134. Specification of Letters Patent. Patented July 27, 1920.

Application filed August 29, 1914, Serial No. 859,208. Renewed April 21, 1920. Serial No. 375,649.

*To all whom it may concern:*

Be it known that I, SIDNEY G. BARNSTEAD, a citizen of the United States, and a resident of Boston, in the county of Suffolk and Commonwealth of Massachusetts, have invented certain new and useful Improvements in Receptacles, of which the following is a full, clear, and exact description.

The purpose of this invention is the construction of a receptacle especially designed for holding tobacco, either in a cut form, or in the shape of cigars, which can be easily opened but when released will automatically close itself, and which, moreover, remains closed with an air-seal effectually preventing evaporation and consequent drying of the tobacco.

To this end I prefer to provide a fixed cover, and beneath it a rotatable receptable weighted to automatically return to and remain with its open mouth close beneath the cover.

Referring to the drawings forming part of this specification, Figure 1 is a central vertical section of the receptacle embodying my improvements. Fig. 2 is a similar section but in a different plane, showing the receptacle in a nearly open condition.

I prefer to have the receptacle 1 and its cover 2 compose substantially a sphere, with the cover slightly larger in diameter to permit the receptacle to fit loosely within it. Said cover is provided with oppositely disposed ears 3, either integral therewith or attached thereto, which are fastened to the extremities of the bifurcated standard 4 so that the cover will remain fixed in position.

At diametrically opposite points on the receptacle 1 are bosses 5 loosely entered by pivotal screws 6, as shown at the right hand part of Fig. 1; and in the bottom of the receptacle is fixed a weight 7 sufficient in amount to counterbalance the remainder of the receptacle and contents and to return the same to the position shown in Fig. 1, with the open mouth 9 within the cover 2.

As shown in Fig. 2, the receptacle is provided with a thumb piece 10 by means of which the receptacle may be turned to bring its mouth out from beneath the cover.

By having the open mouth 9 well up within the cover, as indicated in Fig. 1, so that the edge of the cover is considerably below the edge of the mouth, an air-seal is formed which effectually seals the receptacle against any evaporation therefrom.

To fill this receptacle I prefer to tip the whole thing, standard and all, over on its side to present the mouth 9 upward and uncovered. It is then filled to the amount desired, and the device replaced upon its standard, thereby causing the open mouth to swing beneath the cover and to be closed.

For removing a small amount of the receptacle's contents, a finger is pressed upon the thumb-piece 10 until enough of the mouth is presented from beneath the cover to permit the abstraction of the quantity wished. The release of the thumb-piece permits the receptacle to rotate back to its covered position.

What I claim is:

A receptacle comprising the larger part of a hollow sphere rotatively supported concentric with its axis, the remainder of the sphere being absent to form an open mouth, the lower part of the sphere being weighted to gravitationally present the open mouth normally uppermost and with its circle in a horizontal plane, a cover comprising a segment of a hollow sphere whose interior radius is slightly in excess of that of the exterior of the first-named hollow sphere, the edge of the cover being in a horizontal plane and lower than the normal plane of the said mouth and a standard rigidly supporting the cover and serving as the rotative support for the first-named hollow sphere, whereby the edges of the cover coming down and about the edges of the receptacle, serve as a seal to prevent evaporation from the receptacle.

In testimony that I claim the foregoing invention I have hereunto set my hand this 26th day of August, 1914.

SIDNEY G. BARNSTEAD.

Witnesses:
A. B. UPHAM,
HARRY SILVERMAN.